United States Patent [19]

Stemmle

[11] 4,080,063
[45] Mar. 21, 1978

[54] COPIER DOCUMENT HANDLING SYSTEM

[75] Inventor: Denis J. Stemmle, Williamson, N.Y.

[73] Assignee: Xerox Corporation, Stamford, Conn.

[21] Appl. No.: 804,700

[22] Filed: Jun. 8, 1977

[51] Int. Cl.² .................. G03B 27/62; G03B 15/28
[52] U.S. Cl. ........................ 355/50; 355/8; 355/16; 355/75
[58] Field of Search ................ 355/47–51, 355/75, 76, 3 R, 8, 11, 14, 16

[56] References Cited
U.S. PATENT DOCUMENTS

| 3,642,370 | 2/1972 | Meredith et al. | 355/75 |
| 3,963,345 | 6/1976 | Stemmle et al. | 355/50 |
| 3,997,263 | 12/1976 | Stemmle | 355/51 X |

Primary Examiner—Donald A. Griffin

[57] ABSTRACT

A dual mode document handling system for a copier in which a web/scroll system provides document recirculation for pre-collation copying at the copier platen, and also provides semi-automatic feeding of documents across the platen using the same web, with repositioning of the web scrolls.

8 Claims, 2 Drawing Figures

COPIER DOCUMENT HANDLING SYSTEM

SUMMARY AND BACKGROUND OF THE INVENTION

This invention relates to a document handling system for copiers in which documents may be recirculated in a separated manner for pre-collation copying, or selectively individually copied.

For the faster xerographic and other document copiers now in commercial use, it is increasingly desirable to provide for automatic handling of the individual original documents being copied in order to utilize those higher speed copying capabilities. However, such documents can vary widely in sheet size, weight, thickness, material, condition, humidity, age, and value. The documents may have curls, wrinkles, tears, "dog-ears", cutouts, overlays, paste-ups, tape, staples, adhesive areas, or other defects. Yet it is desirable to be able to automatically copy a set of documents with a mixture of sizes, types, and conditions. Further, it is desirable to automatically handle such documents with a relatively compact and inexpensive document handling system. Preferably the document handling system is one which may be placed over an existing or conventional external transparent copying platen (window) of a copier, and which can utilize the same existing or conventional optics system. That is, it is desirable that the automatic document handling system be readily removable from the platen area by the copier operator whenever desired to allow conventional manual copying of documents, such as books, on the same copying platen.

An especially difficult document handling problem is the automatic separation of individual documents for copying from a stack or set of unseparated documents without damage to or wear of the documents. Thus, a document handling system which handles pre-separated documents is desirable.

Another highly desirable feature for a document handling system for a copier is to provide automatic document recirculation for pre-collation copying. As discussed, for example, in detail in U.S. Pat. No. 3,963,346, issued June 15, 1976, to D. J. Stemmle, et al., at Columns 1-4, such pre-collation copying systems provide a number of important advantages. The copies exit the copier in pre-collated sets, and do not require subsequent sorting in a sorter or collator. On-line finishing and/or removal of completed copy sets may be provided while additional copy sets are being made from the same document set. Any desired number of such copy sets may be made by making a corresponding number of recirculations of the document set in collated order past a copying station and copying each document once each time it recirculates.

However, a disadvantage of pre-collation copying systems is this fact that the documents must all be repeatedly recirculated and repeatedly individually copied the number of times equivalent to the desired number of copy sets. Thus, for example, to make 10 copy sets of a 5 (page) document set or book, one copy at a time would be made of each of the 5 document pages in this order: Pages 1, 2, 3, 4, 5; 1, 2, 3, 4, 5, etc.; repeated a total of 10 times to make the desired 10 copy sets. For bi-directional pre-collation copying this document copying sequence would, instead, be 1, 2, 3, 4, 5; 5, 4, 3, 2, 1; 1, 2, 3, 4, 5; etc.. Also, document recirculation normally requires an increased and non-linear document path length. Thus, it may be seen that increased document handling is necessitated for a pre-collation copying system as compared to a post-collation system in which all the desired copies are made at one time from each document page and collated subsequently. In such a post-collation copying system the document set need only be circulated once to fill the bins of the copy sheet sorter or collator with the number of copy sets desired (limited in number, however, to the number of bins).

The present invention provides an automatic precollation document handling system in which a set of individual documents may be maintained pre-separated for any desired number of recirculations, or alternatively and selectively the same document handling system may be used for non-recirculating document handling with a short and simple document handling path, to minimize document handling, and to maximize the ability to copy different or defective documents, and to make one or more copies of individual documents at the same time. The system disclosed herein is particularly suitable for, and compatible with, conventional copier platens and optics systems. It is suitable for use as a removable or auxiliary document handling system, removably overlying an existing or conventional copier platen to selectively allow use of that same platen and its associated optics for manual or other non-pre-collation copying.

ART STATEMENT

The recirculation of a plurality or set of individual pre-separated documents in pre-collated order to make multiple collated copy sets from the documents, including scroll means for temporarily storing the documents, maintained fully separated, between recirculations is described in detail in the above-cited U.S. Pat. No. 3,963,345, issued June 15, 1976, to D. J. Stemmle, et al., and in U.S. Pat. No. 4,008,956, issued Feb. 22, 1977, to the same D. J. Stemmle. Since that basic web/scroll pre-collation document handling system is utilized herein, these patents are incorporated by reference. Other art is cited therein. Allowed application Ser. No. 701,371, filed June 30, 1976, by the same D. J. Stemmle is also made of record.

Removable over-platen web-scroll systems for copiers are shown in U.S. Pat. Nos. 3,147,679, issued Sept. 10, 1964, to R. M. Schaffert (FIG. 4, Col. 8, lines 57-63); 3,240,596, issued Mar. 15, 1966, to H. C. Medley, et al. (FIG. 3, Col. 8, lines 3-9); and U.S. Pat. No. 3,642,370, issued Feb. 15, 1972, to W. Meredith. The two former patents mention alternative individual document feeding into the same exposure system. U.S. Pat. No. 4,000,943, issued Feb. 13, 1977, to Ari Bar-on, and U.S. Pat. No. 4,018,523, issued Apr. 19, 1977, to E. L. Hughes, teach dual mode over-platen endless document belt systems, moving document stationary optics copying or stationary document moving optics copying. Also noted are U.S. Pat. No. 3,844,654, issued Oct. 29, 1974, to J. Guenther, especially Col. 4, and U.S. Pat. No. 3,909,128, issued Sept. 30, 1975, L. R. Sohm.

Various other patents disclose over-platen single pass (non-recirculating and non-pre-collation) document belt systems. Allowed application Ser. No. 561,465, filed Mar. 26, 1975, by John R. Caldwell, teaches a removable vacuum belt document transport spaced above a copier platen. As noted there, such document handling systems may be used with either fully planar or known generally planar, but slightly curved, platens.

A separable platen cover/document handling unit providing access therethrough to a copier platen is disclosed in U.S. Pat. No. 3,685,905, issued Aug. 22, 1972.

An exemplary embodiment of the present invention is shown and described hereinbelow as incorporated into an otherwise conventional exemplary xerographic apparatus and process. Accordingly, said xerographic apparatus and process itself need not be described in detail herein, and is shown schematically, since various publications, patents, and known apparatus are available to teach details thereof to those skilled in the art, including those cited above.

The present document handling system may be utilized with known stationary document scanning type optics systems, or moving document fixed optics systems, flash illumination full frame illumination moving or stationary optics systems, and various magnification systems therefor. Various such systems are shown in the above-cited patents. U.S. Pat. No. 3,775,008, issued Nov. 27, 1973, to R. A. Schaeffer, et al., and U.S. Pat. No. 3,832,057, issued Aug. 27, 1974, to D. K. Shogren, are further examples of the former. The present invention is adaptable to various such document imaging systems. Various structures and teachings from all of the patents cited in this application may be incorporated by reference in this specification to the extent appropriate.

BRIEF DESCRIPTION OF THE DRAWINGS

Further objects, features and advantages of the present invention pertain to the particular apparatus and steps whereby the above-mentioned aspects of the invention are obtained. Accordingly, the invention will be better understood by reference to the following description, and to the drawings forming a part thereof, which are approximately to scale, wherein.

DETAILED DESCRIPTION OF PREFERRED EMBODIMENTS

Figure 1:
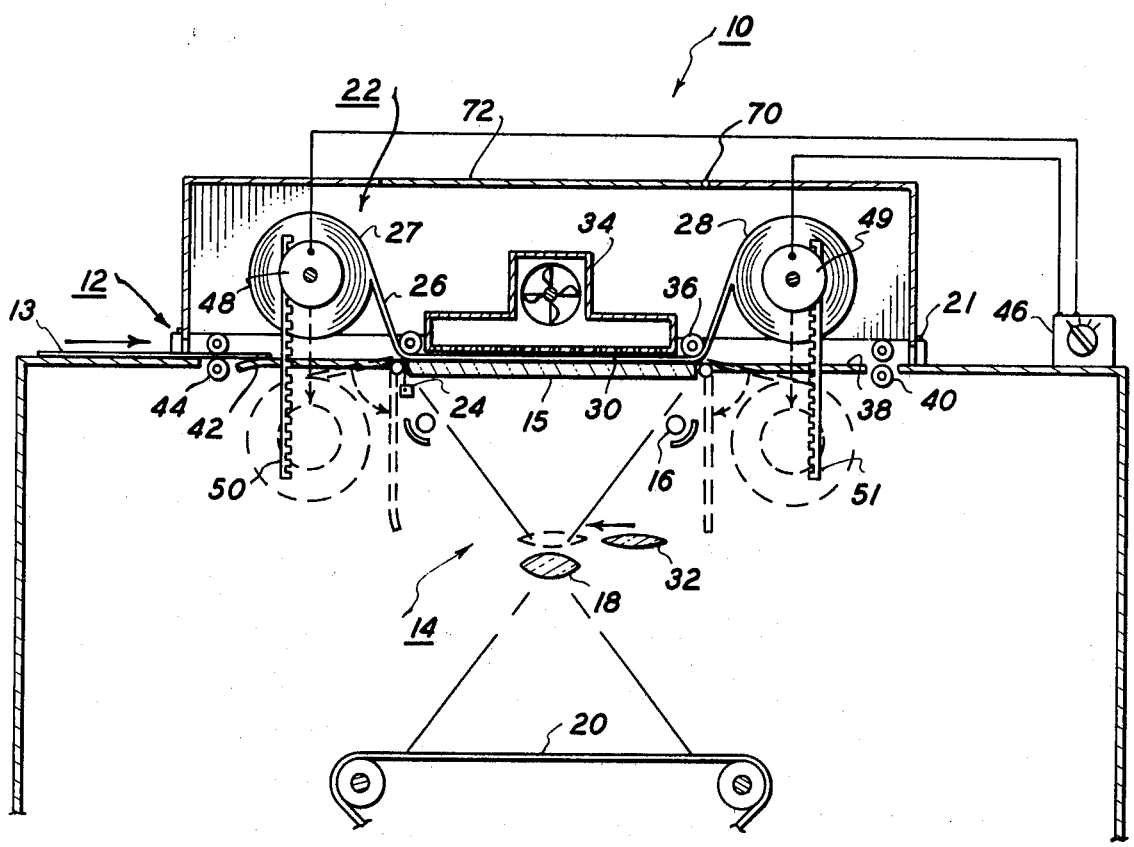
FIG. 1 is a cross-sectional side view of an exemplary automatic document handling system in accordance with the present invention on a exemplary conventional xerographic copying apparatus.
Figure 2:
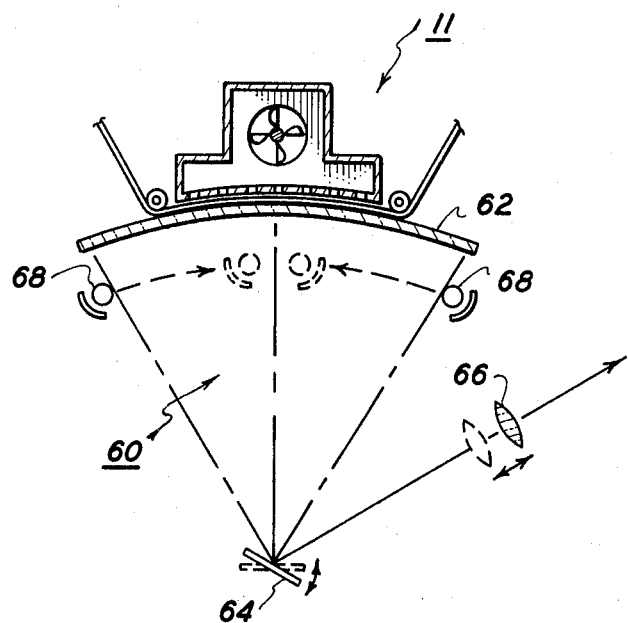
FIG. 2 is a partial cross-sectional side view of another embodiment of the document handling system of FIG. 1 for a curved platen copier.

FIGS. 1 and 2 illustrate two examples of the present invention. It will be appreciated that the subject document handling system may have many other different orientations and structures, and different combinations with different exemplary xerographic or other copying systems and optics systems thereof, as noted above.

There is shown in FIG. 1, and partially in FIG. 2, fully automatic document handling systems (DHS) 10 and 11, respectively, into which a set of documents may be loaded, and stored and automatically recirculated by a desired number of recirculations, or fed through without storage for a single-pass copying instead. The individual documents are exposed for copying in each recirculation of the document set. These documents may be conventional full size sheets of paper. The embodiment 11 of FIG. 2 may be similar to the embodiment 10 of FIG. 1, in all details other than those illustrated in FIG. 2, and accordingly most of the description of FIG. 1 herein is applicable thereto.

As shown in FIG. 1, the documents may be loaded manually, or automatically from a stack, into the copier DHS 10 at a loading or input area 12, which here is at the left side of the DHS. Individual documents such as 13 are then carried into the optical imaging station 14 of a conventional optics system integral the copier. This is shown schematically in FIG. 1 by a conventional planar full size glass platen 15 exposed by exposure lamps 16. A lens 18 focuses the image of the document being copied on the platen 15 onto a photoreceptor 20, preferably though a conventional optics arrangement as shown in the patents cited above. As indicated above, while a full frame system is illustrated in FIG. 1, it will be appreciated that alternatively, a selectable moving document, slit exposure, or moving mirror flowing strip image optics system may be utilized for copying the individual documents, as in the embodiment 11 of FIG. 2. Instead of a full document size flat platen 15, a curved platen as in FIG. 2 or a small copying window may be utilized in connection with such other optics scanning systems. The horizontal platen 15 is that used for manual document copying, and is accessable by pivoting the entire DHS unit away from the platen by its hinge mounting 21 to the copier.

The documents to be copied are transported onto, across, and off of the upper surface of the platen 15 by an elongate document belt or web system 22. A document lead edge sensor or gate 24, or other registration means, is provided to register documents as they are loaded onto the web system 22.

As noted above, details of the document web system 22 per se, and suitable registration means, are disclosed in the incorporated patents, particularly U.S. Pat. No. 4,008,956, and need not be described herein. As described in that patent, the web system 22 consist of an elongated windable document supporting web 26. As shown in FIG. 1 here, a spaced pair of oppositely wound scrolls 27 and 28 of the web 26 are formed on winding axles or spools and positioned at the opposite sides of the imaging station 14. The scroll 27 is positioned slightly beyond the left hand or upstream (input) side of the platen 15, while the other scroll 28 is positioned slightly beyond the opposite or output side of the platen 15. It will be appreciated that the selection of document input and output sides will depend on the overall machine configuration, and therefore, may be from right to left rather than from left to right as shown here.

As described in the incorporated U.S. Pat. No. 4,008,956, the scrolls 27 and 28 selectively wind up the web 26 with a set of documents thereon into the scrolls to retain the documents between the windings of the web on both of the web scrolls. The web 26 has a minor intermediate unwound segment 30 extending between the two scrolls. This intermediate segment of the web is here positioned to move through the imaging station 14. Specifically, the intermediate segment 30 is positioned parallel and closely spaced above the platen 15, so as to confine documents between the web 26 and the platen 15.

Preferably, the documents are confined on the web 26 within the existing depth of field of the optical imaging station 14, i.e., within the depth of field normally provided by the lens 18 for documents manually placed directly on the upper surface of the platen 15. This enables the same optics system and configuration to be utilized for documents automatically transported by the DHS system 10 as for documents manually placed on the platen 15. However, where it is desired to space the intermediate segment of the web 30 by a greater distance above the platen 15, e.g., greater than 1 millimeter, to provide fully unobstructed movement of all documents through the optical imaging station 14, then conventional refocusing means must be provided. Examples here are the add lens 32 of FIG. 1 or the repositionable lens of FIG. 2, to provide refocusing of the optical imaging station 14 on the documents on the web intermediate segment 30, at a slightly different focal distance than for the platen 15.

As shown in FIG. 1, and described in the U.S. Pat. No. 4,008,956, a vacuum manifold system 34 provides an apertured planar guide surface engaging and supporting the upper surface of the intermediate segment 30 of the web 26 to control the configuration thereof. It applies a vacuum through the web 26 intermediate segment 30 to retain documents against the web uniformly throughout the imaging station 14. A similar, but smaller, unit is shown in FIG. 2 with a curved lower surface.

The vacuum manifold units shown herein may be replaced by multiple small wheels, or an endless belt, or a low friction guide surface, or other suitable means for supporting the document web with the desired orientation and pressure above the platen in the imaging area. In that case, of course, the driving of the document will be provided by the frictional, and possibly electrostatic, engagement of the document between the moving belt and the document as in various of the above cited patents rather than vacuum retention.

For pre-collation ADH, drive motors connecting to one or both of the axes or spools of the scrolls 27 and 28 are provided for selectively recirculating winding and unwinding the web 26 between the web scrolls 27 and 28 through the imaging station 14 to expose individual documents on the web between the web scrolls for copying in a pre-collated order by the copier's existing optical imaging means.

When the scrolls 27 and 28 are in their dashed positions illustrated in FIG. 1, it may be seen that the intermediate segment 30 of the web extends substantially linearly therebetween, i.e., the web 26 runs substantially linearly between the nips of the two scrolls, and is inside wound, so that documents may be recirculated back and forth between the two scrolls without being stripped from the web at any point. This allows the document handling system 10 to be operated in a pre-collation copying mode in which the same set of documents is repeatedly recirculated and repeatedly copied to provide pre-collated copy sets, as described in detail in said U.S. Pat. No. 4,008,956. In this pre-collation copying position, both scrolls are below the plane of the platen 15.

In the document handling system described herein, differing from the above-cited systems, further means are provided for selectively simultaneously repositioning both of the scrolls 27 and 28 above the plane of the imaging station, i.e., into the scroll positions illustrated in solid lines in FIG. 1, to automatically provide single pass, semi-automatic, document copying, in which the documents are fed straight through the imaging station 14 and ejected therefrom automatically by the intermediate segment 30 of the web 26 rather than being wound up on either of the web scrolls.

In this different, non-pre-collation, copying mode of operation, the same web system 22 and web 26 is utilized to transport the documents onto, over, and off of the platen 15. Thus, a separate, conventional endless, document belt is not required. The much greater length of the web 26 provides a much greater available surface area, and therefor a potentially longer service life, than a shorter endless belt overlying the platen.

In this semi-automatic mode of operation, whenever a document like 13 is fed into the input area 12, and registered by the registration system 24, the web scroll drive advances the web 26 to move the document into its copying position over the platen 15. The document may be stopped in registration over the platen for a stationary document exposure system, or continuously moved thereacross for a moving document copying system. In either case the pneumatic and/or frictional engagement of the document by the web 26 is the sole drive required for the document in the imaging station. The input area 12 may also have, for example, the input roller pair 44 and input guide surface 42 shown here.

As the document being copied in this non-recirculating mode exits the imaging station 14 it is automatically stripped from the web 26 and ejected from the web system 22, and the imaging station, by the sharp arcuate wraping of the web 26 around a stripping roller 36 fixed adjacent the output or downstream side of the imaging station 14. This wrapping occurs automatically from the raising of the downstream scroll 28 above the level of the roller 36. The document is then further ejected from the document handling system 10 by, for example, a downstream guide surface 38 and a fixed output roller pair 40.

Both the guide surfaces 38 and 42 here are pivotally hinged adjacent their respective edges of the platen 15, and are connected for common movement with the axes of their respective scrolls 28 and 27. That is, when the scrolls 27 and 28 are moved down into their dashed positions illustrated, the guide surfaces 42 and 38 are also automatically pivoted down into their respective illustrated dashed positions at the same time by the same mechanism.

FIG. 1 shows one example of means for selectively repositioning both of the scrolls 27 and 28 above and below the plane of the imaging station to select between different modes of document handling operation, i.e., for movement between the illustrated solid and dashed positions thereof. The dashed positions are lower than desired, for drawing clarity. Preferably the entire intermediate segment 30 is maintained planar or slightly convex in this position. An electrical control switch 46 with four different switch positions here is connected to two small gear motors 48 and 49 respectively positioned inside the scrolls 27 and 28. The gear motors 48 and 49 respectively engage fixed vertical gear racks 50 and 51. By selectively actuating the gear motors 48 and 49 through switch 46 the scrolls may be repositioned up or down along the appropriate racks between their two respective positions. Many alternative mechanisms are suitable for the vertical movements of the two scrolls.

Referring in further detail to the automatic repositioning of the scrolls for multi-mode copying operation, as previously described, in the mode illustrated by the solid line positions of the scrolls 27 and 28, at the first position of switch 46, with both scrolls raised above the plane of the platen 15, both scrolls are raised above the path of the document 13. Individual documents may be fed directly through the document handling system 10 across the platen in any desired order, and any desired number of copies may be made at one time from a document on the platen 15.

To switch to a pre-collation copying mode of operation, the set of documents to be recirculated is loaded into the document handling system 10 by maintaining the scroll 27 in its raised position above the platen while lowering the scroll 28 below the platen with the switch 46 in its second position. This provides unobstructed loading at the document loading area 12 onto the web intermediate segment 30 via the rollers pair 44 and the guide surface 42 and the registration gate 24. Since in this mode the scroll 28 is down, the web 26 extends linearly from the platen 15 into the nip of the scroll 28 so that all of the documents loaded onto the web are wound up into the scroll 28 after passing through the imaging station 14.

In the third mode of operation, selected by a third position of the switch once all of the documents of the document set have been loaded onto the web 26 and wound up into the scroll 28, the scroll 27 is lowered into its pre-collation copying position below the plane of the platen 15, so that both scrolls are below the platen in positions in which the intermediate segment of the web extends linearly therebetween for recirculatingly winding and unwinding the web and the documents thereon between both of the scrolls.

In the fourth mode of operation, selected by the fourth position of the switch 46, once the desired number of copy sets have been made by the multiple recirculations of the web in the above-described mode, the automatic unloading of the documents from the web is provided. This is accomplished by raising the scroll 28 above the plane of the platen while maintaining the scroll 27 below the plane of the platen, prior to the last circulation of the web from the scroll 27 to the scroll 28. Thus, as the web is wound up on the scroll 28 on the last pass of the documents, all of the documents on the web are automatically stripped off as the web deforms around the stripping roller 36 and ejected by the guide surface 38 and exit rollers 40.

After this last winding of the web to unload the documents stored in the scrolls, the web may be automatically rewound, and the other scroll 27 raised above the platen, so that the document handling system 10 is restored to its first mode position, ready to receive documents for individual non-pre-collation copying.

As noted above, for a system in which the document input and output areas are reversed, i.e., at opposite sides of the platen from those illustrated here, the above-described four modes of operation could be the same except that the vertical positions of the respective scrolls would be reversed for loading and unloading documents.

It will be appreciated that the input and output rollers 44 and 40, and the input and output guides 42 and 38 are merely exemplary, and that various other input and output systems for the documents may be provided.

Referring now to the embodiment of FIG. 2, as previously noted this is a partial view of another embodiment which in other respects not shown could be similar or identical to the embodiment of FIG. 1. Thus, the foregoing description is fully applicable thereto except for the differences which will be noted herein. The document handling system 11 of FIG. 2 is shown on an optical imaging station 60 of the type utilized in a Xerox Corporation "3600" or "7000" copier. It has a slightly curved platen 62 which for manual or other stationary document copying is scanned by pivotal mirror 64 and imaged by stationary lens 66.

It may be seen in this embodiment that the document handling system 11 occupies only a minor area of the platen 62. This is achieved by selectively fixing the mirror 64 at one central viewing position of the platen for the copying of documents by the DHS 11, and utilizing a moving document, stationary optics, copying system for the DHS 11. Both this mode and the otherwise full frame pivoting mirror imaging of the entire platen for stationary document copying utilize the same optical elements. If desired, the two document illumination lamp/reflector units 68 may be moved from their positions outside of the full platen viewing area into the illustrated central dashed positions thereof automatically when changing to the moving document DHS copying mode here.

As previously indicated, the lens 66 may be repositioned along its fixed optical axis to the dashed position shown to change the focal distance thereof to compensate for the difference in distance between the upper surface of the platen 62 versus the position of the documents above the platen on the moving web of the DHS 11. Alternatively, mirror 64 may be repositioned.

Considering some of the various potential alternative embodiments of both FIGS. 1 and 2, it will be appreciated, for example, that various mounting or removal systems may be utilized for the DHS system to allow its removal for access to the platen for manual copying. For example, the entire DHS unit could be on a separate module which could be wheeled up to the copier and slid over the platen and electrically connected to the copier for its control and power supply. This would not require lifting and counter-weighting or spring loading of the DHS unit. Another alternative would be to provide a system in which the platen could be moved relative to the DHS unit.

Another alternative, particularly where a vacuum manifold 34 is not utilized, would be to leave the DHS unit in position over the platen at all times, and to remove only a central portion thereof overlying the platen to expose the platen. This is illustrated here by a hinge 70 and a hinged portion 72 of the outer cover of the DHS unit to provide access to the platen. The vacuum manifold unit 34 would be removed, and a platen-sized aperture in the web provided, adjacent one end of the web. Thus, by unwinding the web to that aperture the web would not obstruct access to the platen for manual copying. This access aperture through the web to the platen can be provided by removing all of the web at one end except for the edge areas thereof, or by substituting a wire at each edge to provide the necessary web continuity (connection to the scroll axis) so that the web may be rewound back to its normal operating position.

In conclusion it may be seen that there has been described herein an improved multi-mode document handling system for the copying of documents. While the exemplary embodiments described herein are presently considered to be preferred, various other modifications or improvements will be apparent to those skilled in the art. The following claims are intended to cover all such variations and modifications as fall within the true spirit and scope of the invention.

What is claimed is:

1. In an automatic document handling system of a copying apparatus for making pre-collated copy sheet sets by recirculating collated imaging of a set of original documents, which copying apparatus has a generally planar imaging station for copying documents with an optical imaging means, which document handling system is positionable over said imaging station, the improvement comprising:

an elongated windable document supporting web, means for forming a spaced pair of oppositely wound scrolls of said web positioned beyond the respective opposite sides of said imaging station for selectively winding up a set of documents on said web into said scrolls to retain said documents between windings of said web on both said web scrolls, said web having a minor intermediate unwound segment extending between said web scrolls, said intermediate segment of said web being positioned to move through said imaging station, means for selectively recirculatingly winding and unwinding said web between one said web scroll and the other said web scroll through said imaging station to expose individual documents on said web between said web scrolls for copying by said optical imaging means in a pre-collated order, and means for selectively repositioning both of said scrolls above the plane of said imaging station to automatically provide single pass semi-automatic document copying in which said documents are fed through and ejected from said imaging station by said intermediate segment of said same web rather than wound on said web scrolls.

2. The document handling system of claim 1, wherein said imaging station is an external, manually accessible, solid, transparent, generally horizontal platen for manual copying of individual documents stationary thereon.

3. The document handling system of claim 2, wherein said intermediate section of said web is moved closely and uniformly above only a minor portion of said platen to transport documents over said platen for moving document copying.

4. The document handling system of claim 2, wherein said platen is slightly curved and means are provided for conforming said intermediate segment of said web to the curvature of said platen.

5. The document handling system of claim 1, wherein said imaging station is a copying platen, and wherein said means for selectively repositioning said scrolls includes;

means for raising both said scrolls above said platen to move documents across said platen with said web without winding the documents into either of said scrolls, means for raising a first scroll above the platen while lowering a second scroll below the platen, for loading documents onto said web and winding these documents into said second scroll, means for lowering both said scrolls below said platen into positions in which said intermediate segment of said web extends substantially linearly therebetween, for recirculatingly winding and unwinding said web and the documents thereon between both said scrolls, and means for lowering said first scroll below the platen and raising said second scroll above said platen, for unloading documents from said web.

6. The document handling system of claim 1, wherein for said recirculating pre-collation copying both said scrolls are positioned below said imaging station in positions in which said intermediate segment of said web extends substantially linearly between the nips of said scrolls with said intermediate segment, and wherein when a said scroll is raised above said imaging station, said intermediate segment of said web is sharply arcuately deformed.

7. In an automatic document handling method for making pre-collated copy sheet sets by recirculating a set of original documents past a generally planar imaging station in a copier and copying the documents, wherein the document handling system includes an elongated windable document supporting web and a spaced pair of oppositely wound scrolls of said web positioned beyond the respective opposite sides of said imaging station for selectively winding up a set of documents on said web into said scrolls to retain said documents between windings of said web on both said web scrolls, said web having a minor intermediate unwound segment extending between said web scrolls which is moved through said imaging station, the improvement comprising:

selectively recirculatingly winding and unwinding said web and the documents thereon between one said web scroll and the other said web scroll through said imaging station to expose individual documents on said web for copying in a pre-collated manner, and selectively repositioning both of said scrolls above the plane of said imaging station to automatically provide single pass semi-automatic document copying in which said documents are fed through and ejected from said imaging station by said intermediate segment of said web rather than wound on said web scrolls.

8. The document handling method of claim 7, wherein said imaging station is a copying platen, and wherein said selective repositioning of said scrolls includes, in selected sequence, the steps of:

raising both said scrolls above said platen and arcuately deforming said intermediate segment of said web at locations beyond both sides of said platen, and then moving documents across said platen with said web without winding the documents into either of said scrolls, raising a first scroll above the platen and lowering a second scroll below the platen, and then loading documents onto said web, and moving said web towards said second scroll to wind these documents into said second scroll, lowering both said scrolls below said platen into positions in which said intermediate segment of said web extends substantially linearly therebetween, and then recirculatingly winding and unwinding said web and the documents thereon between both said scrolls, and lowering the first scroll below the platen and raising the second scroll above the platen and moving the web towards the second scroll to unload documents from the web.

* * * * *